United States Patent [19]
Furuhata et al.

[11] Patent Number: 4,599,569
[45] Date of Patent: Jul. 8, 1986

[54] METHOD AND APPARATUS FOR DETECTING A PHASE OR FREQUENCY ERROR OF A SIGNAL

[75] Inventors: Takashi Furuhata, Yokohama; Taihei Nakama; Yuuhei Abe, both of Katsuta; Kenji Satoh, Yokohama, all of Japan

[73] Assignee: Hitachi, Ltd., Tokyo, Japan

[21] Appl. No.: 579,593

[22] Filed: Feb. 13, 1984

[30] Foreign Application Priority Data

Feb. 14, 1983 [JP] Japan .................................. 58-21443

[51] Int. Cl.$^4$ .............................................. H03K 5/26
[52] U.S. Cl. ..................................... 328/111; 307/265
[58] Field of Search ...................... 328/109, 111, 141; 307/265; 318/318

[56] References Cited

U.S. PATENT DOCUMENTS

| 3,950,682 | 4/1976 | Dohanich, Jr. ....................... 318/318 |
| 3,974,428 | 8/1976 | Hafle ................................... 318/318 |
| 4,052,676 | 10/1977 | Crittenden ........................... 328/141 |
| 4,243,921 | 1/1981 | Tamura et al. ....................... 318/318 |

Primary Examiner—Stanley D. Miller
Assistant Examiner—K. Ohralik
Attorney, Agent, or Firm—Antonelli, Terry & Wands

[57] ABSTRACT

A detector circuit for detecting a phase or frequency error of an input signal. One mode of at least two detection modes is selected according to a phase or a frequency of the input signal with each mode having a reference value of a phase or a frequency of the input signal and reference values of the detection modes being different from each other. A pulse signal having a phase corresponding to a difference between an actual phase or frequency of the input signal and the reference value of the phase or the frequency is generated, and a predetermined carrier signal is pulse width modulated with a predetermined modulation factor in response to the pulse signal, the modulation factor being different for each detection mode.

4 Claims, 9 Drawing Figures

METHOD AND APPARATUS FOR DETECTING A PHASE OR FREQUENCY ERROR OF A SIGNAL

The present invention relates to a detector circuit and method for detecting the change or difference of the frequency or phase of a signal, and in particular to, but not exclusively, a detector circuit and method for detecting the phase or frequency of a servocontrol system.

Figure 1:
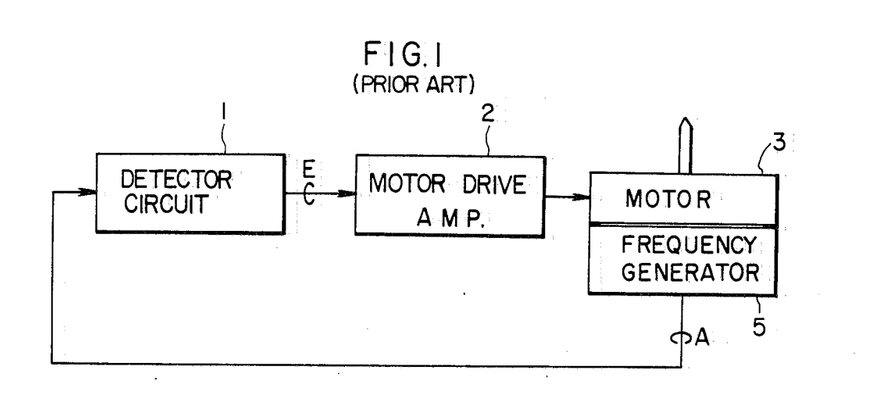
FIG. 1 is a block diagram for illustrating an example of a servocontrol unit of a motor.

FIG. 1 shows an example of a typical servocontrol circuit for controlling a motor so that it will rotate at a constant rotation speed. In FIG. 1, a frequency generator 5 which is attached to a motor 3 produces a signal A having a frequency corresponding to the actual number of rotations of the motor 3. This signal A may be regarded as a signal in which the center frequency corresponding to the control speed is modulated by a modulation frequency corresponding to the speed variation. The signal A is subjected to frequency discrimination in a detector circuit 1 to produce an error signal E which corresponds to the difference between the actual rotation speed and the controlled rotation speed. This error signal E is negatively fed back to the motor 3 through a motor drive amplifier 2 for effecting fixed speed control of the motor 3.

In such a servocontrol system, it is often demanded to rotate the motor 3 with one of a plurality of modes respectively having different numbers of rotations such as a normal number of revolutions, half of the normal number of revolutions or one third of the normal number of revolutions. Such a requirement is provided in a home VTR in which the recording time can be varied by changing over the tape speed, for example.

In case where the motor 3 is rotated with alternative ones of a plurality of modes respectively having different numbers of rotations, it is a matter of course that the center frequency of the signal A fed from the frequency generator to the detector circuit 1 varies according to the selected mode. Assuming that the center frequency of the input signal A is fs, however, the frequency discrimination sensitivity K of the detector circuit 1 is usually in inverse proportion to the square of fs as expressed by $K \propto 1/fs^2$. According to the mode, i.e., the center frequency, the sensitivity of the detector circuit 1 varies and hence the loop gain of the control system varies. Accordingly, the control characteristics are not held constant from mode to mode. Even if the system is under stable control in one mode, therefore, another mode may result in an unstable control system. As a result, the performance and reliability of the unit are deteriorated.

In one conventional method employed as the countermeasure, a direct current amplifier circuit having selectable amplification gain is provided between the detector circuit 1 and the motor drive amplifier 2, and the changeover of an amplification gain to another amplification gain is so effected as to hold the loop gain constant for every mode, uniform control performance for every mode being ensured. Such a conventional method brings about a complicated control circuit system, an increased peripheral circuit scale, and increased adjustment points. Therefore, reduction of the size and cost of the apparatus is prevented.

A method for controlling a capstan motor of a VTR is described in Katsuya Yokoyama et al. "Home VTR for Beginner's" published in Japan in Dec. 15, 1981, p.p.147 to 149. According to this method, clock pulses existing in the time difference between the reference signal and a signal to be compared are counted by an error detection counter, the number of pulses which is proportionate to the time difference being utilized as an error signal. For producing a voltage corresponding to that error signal, a signal having a pulse width varied according to the error is generated by a pulse width modulator and is applied to an integrator to yield a motor control signal. If this method is applied to an apparatus having various speed modes, however, the detection sensitivity is varied from mode to mode as described before. As a result, it is difficult to obtain a servocontrol system which is stable under every speed.

In view of drawbacks of prior art, an object of the present invention is to provide a detector circuit for realizing a stable servocontrol apparatus having uniform controllability for every mode without demanding particular circuit adjustment.

Another object of the present invention is to provide a detector circuit which is used in a phase comparison circuit for discriminating a phase difference between different signals.

Still another object of the present invention is to provide a detector circuit having detection sensitivities which are selectable according to the application.

In accordance with the present invention, the detection output is a pulse width modulation signal having a pulse width which corresponds to the deviation of the phase or frequency of the signal to be discriminated from the predetermined value, and the changeover between modulation degrees of the pulse width modulation signal is effected for change in the frequency mode of the signal to be discriminated so that the detection sensitivity may be uniform for every mode.

The present invention will be apparent from the following detailed description taken in conjunction with the accompanying drawings, in which.

An embodiment of a detector circuit according to the present invention which has been applied to the servocontrol unit illustrated in FIG. 1 will now be described in detail.

Figure 2:
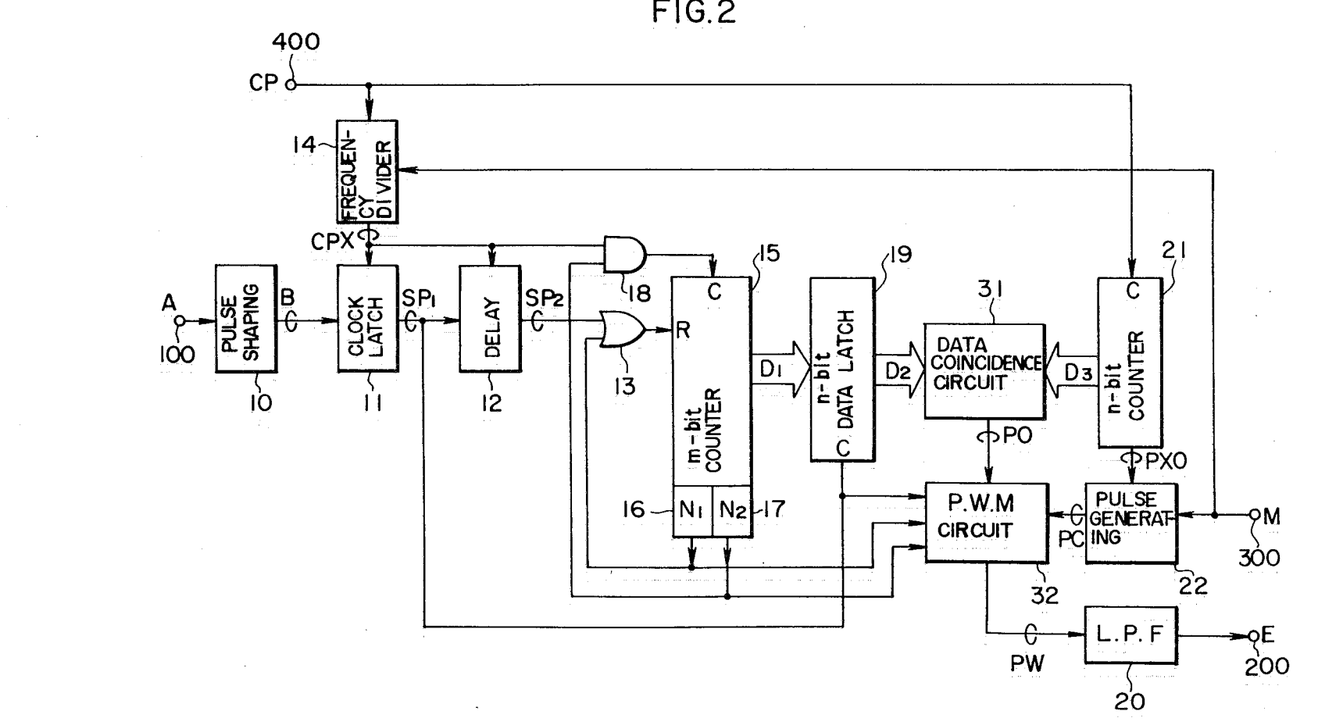
FIG. 2 is a block diagram of an embodiment of a detector circuit according to the present invention.

In FIG. 2, numeral reference 100 denotes an input terminal whereto the signal A is fed from the frequency generator 5 illustrated in FIG. 1. Numeral 200 denotes an output terminal for the error signal E. The output E is fed to the motor drive amplifier 2 illustrated in FIG.

1. Numeral reference 300 denotes an input terminal for a mode designation signal M. One of the first, second and third modes is specified by the mode designation signal M. In the first mode (hereafter abbreviated as $M_1$), the motor 3 is rotated with the number of rotations N. In the second mode (hereafter abbreviated as $M_2$), the motor 3 is rotated with the number of rotations N/2. In the third mode (hereafter abbreviated as $M_3$), the motor 3 is rotated with the number of rotations N/3.

Reference numeral 400 denotes an input terminal for a clock pulse CP fed from a clock pulse generator which is not illustrated.

Reference numeral 10 denotes a pulse shaping circuit, 11 a clock latch circuit, 12 a delay circuit, 13 an OR gate, 14 a frequency divider circuit for clock pulses, 15 a m-bit counter, 16 and 17 decoders, 18 an AND gate, 19 a n-bit data latch circuit, 21 a n-bit counter, 22 a pulse generating circuit, 31 a data coincidence circuit, 32 a pulse width modulation circuit, and 20 denotes a low-pass filter.

Figure 3:
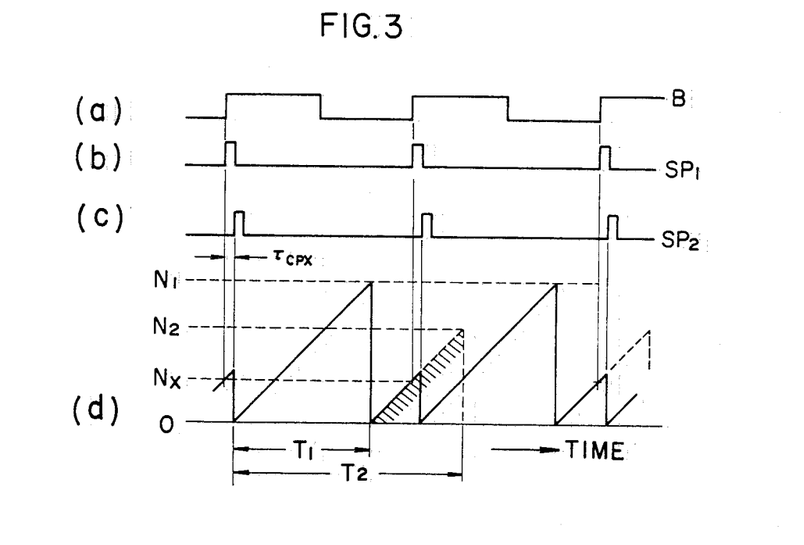
FIG. 3, FIG. 4a, FIG. 4b, FIG. 4c, FIG. 5a and FIG. 5b illustrate waveforms at various points in the detector circuit of FIG. 2.

The input signal A fed to the input terminal 100 is subjected to square pulse shaping in the pulse shaping circuit 10. The output B of the pulse shaping circuit 10 having a waveform as illustrated in FIG. 3(a) is fed to the clock latch circuit 11. In the frequency divider circuit 14, according to the mode designation signal M fed from the terminal 300, the frequency of the clock pulse CP fed from the terminal 400 is divided by 1 in the mode $M_1$, 2 in the mode $M_2$, or 3 in the mode $M_3$. The output clock pulse CPX of the frequency divider circuit 14 is fed to the clock latch circuit 11 and the delay circuit 12 and is also fed to the clock input C of the counter 15 through the AND gate 18.

In the clock latch circuit 11, the output pulse B of the pulse shaping circuit 10 is synchronized with the clock CPX fed from the frequency divider circuit 14. The output $SP_1$ of the clock latch circuit 11, which has been subjected to pulse shaping at the rising edge of the pulse B as shown in FIG. 3(b), is fed to the clock input C of the data latch circuit 19 as a sampling pulse. The clock pulse CPX is counted by the m-bit counter 15. The least significant n bits ($n \leq m$) of the counted value are sent out as the data $D_1$ represented in the binary rotation. The data $D_1$ is latched into the data latch circuit 19 at the edge of the sampling pulse $SP_1$. In the delay circuit 12, in synchronism with the clock pulse CPX fed from the frequency divider circuit 14, the output $SP_1$ of the clock latch circuit 11 is delayed by one period ($\tau cpx$) of the clock pulse CPX. A reset pulse $SP_2$ which is sent out from the delay circuit 12 as illustrated in FIG. 3(c) is fed to the reset input R of the counter 15 through the OR gate 13, the counter 15 being reset.

Numerals 16 and 17 denote decoders for decoding the value which has been counted by the counter 15. When the value counted by the counter 15 has reached $N_1$, the decoder 16 sends out the "high" level. When the counter 15 is reset, the decoder 16 sends out the "low" level. Only when $N_2$ pulses have been counted by the counter 15 after $N_1$ pulses were counted, the decoder 17 sends out the "low" level. When the counter 15 is reset by the output $SP_2$ of the delay circuit 12, the decoder 17 sends out the "high" level.

FIG. 3(d) is an analog representation of counting operation carried out by the counter 15. The abscissa represents the time and the ordinate represents in the decimal rotation the value counted by the counter 15. By referring to FIG. 3, the operation of the circuit illustrated in FIG. 2 will now be described in further detail.

At first, when the counter 15 is reset by the reset pulse $SP_2$ which is supplied from the delay circuit 12 through the OR gate 13, the "high" level output of the decoder 17 opens the AND gate 18 to supply the clock pulse CPX fed from the frequency divider circuit 14 to the counter 15, counting operation in the counter 15 being started. When the value counted by the counter 15 has reached $N_1$ as illustrated in FIG. 3(d), the counter 15 is reset by the "high" level output of the decoder 16 which is fed thereto through the OR gate 13. Then, the counter 15 restarts counting operation starting from Zero. When the sampling pulse $SP_1$ is fed from the clock latch circuit 11 to the C terminal of the data latch circuit 19, the data $D_1$ (corresponding to the counted value $N_x$ in FIG. 3) of the n-bit counter 15 is read and latched into the data latch circuit 19 at the rising edge of the sampling pulse $SP_1$. Upon receiving thereafter the reset pulse $SP_2$ produced by delaying the sampling pulse $SP_1$, the counter 15 is reset again.

If the value counted by the counter 15 exceeds a count of $N_2$ after having counted to $N_1$ during a period between resetting the counter 15 by the reset pulse $SP_2$ and application of the next reset pulse $SP_2$, the AND gate 18 is closed by the "low" level output which is sent out by the decoder 17 when the counter has continuously counted $N_2$ pulses after having counted $N_1$ pulses. Thereafter the counting operation of the counter 15 is suspended until the next reset pulse $SP_2$ is applied.

Subsequently, the output data $D_2$ (binary value) of the data latch circuit 19 is fed to the data coincidence circuit 31. On the other hand, the clock pulse CP is fed from the terminal 400 to the clock input C of the n-bit counter 21. The counter 21 counts clock pulses CP to send out the data $D_3$ composed of n bits representing the counted binary value. The data $D_3$ is fed to the data coincidence circuit 31.

In the data coincidence circuit 31, the data $D_2$ composed of n bits is compared bit by bit with the data $D_3$ composed of n bits. When coincidence is found between the data $D_2$ and $D_3$, the data coincidence circuit 31 feeds a coincidence pulse PO to the pulse width modulation circuit 32 as a modulation signal.

The n-th bit, i.e., the most significant bit PXO of the counted value in the counter 21 is fed from the counter 21 to the pulse generating circuit 22. Based on the PXO signal, the pulse generating circuit 22 generates a carrier signal PC having a frequency defined by the mode designation signal M and feeds the carrier signal PC to the pulse width modulation circuit 32. (Generation of the carrier signal PC will later be described in detail.)

In the pulse width modulation circuit 32, the carrier signal PC which is the output of the pulse generating circuit 22 is subjected to pulse width modulation under the coincidence pulse (modulation signal) PO fed from the data coincidence circuit 31. A pulse width modulation signal PW sent out from the pulse width modulation circuit 32 is demodulated by the low-pass filter to feed an error signal E corresponding to the pulse width to the terminal 200. The error signal E is negatively fed back to the motor 3 through the motor drive amplifier 2 for effecting the fixed speed control.

Assuming that the detection center frequency (carrier frequency) of the input signal A is fs and the frequency of the clock pulse CPX is $f_{cpx}$, $N_1$ and $N_2$ of decoders 16 and 17 and the number of bits n for the data latch circuit 19 and the counter 21 are defined as $$f_{cpx}/f_s = N_1 + 2^{n-1} \qquad (1)$$

$$N_2 = 2^n \qquad (2)$$

That is to say, the expression (1) indicates that the number of clock pulses CPX counted during one period of the detection center frequency $f_s$ which is the frequency corresponding to the control speed of the motor is $N_1 + 2^{n-1}$. Assuming that the center frequency $f_s$ is represented by FIG. 3(a), $f_{cpx}/f_s$ corresponds to the count during a period ranging from the adjacent sampling pulses $SP_1$ illustrated in FIG. 3(b). The expression (2) indicates that it is possible to detect a frequency deviation corresponding to counts as many as $2^n$.

The value $N_x$ of the output data $D_2$ from the data latch circuit 19 is a value corresponding to the variation in the frequency of the input signal A, i.e., variation in the speed of the motor and is limited as $$0 \leq N_x < 2^n \qquad (3)$$

Especially at the center frequency of the input signal A which is defined by the expression (1), we have $$N_x = 2^{n-1} \qquad (4)$$

The detection sensitivity $K_o$ of a portion of the detector circuit illustrated in FIG. 2 ranging from the input terminal 100 to the data $D_2$ output of the data latch circuit 19 (i.e., the ratio $K_o$ of a variation in the data $D_2$ to a variation in the frequency of the input signal A) may be expressed as $$K_o = \frac{1}{2\pi \cdot f_s^2} \times \frac{f_{cpx}}{2^n} \qquad (5)$$

For various input signals having different center frequencies $f_s$ to be detected while commonly using almost all of the portion of the detector circuit ranging from the input terminal 100 to the data latch circuit 19, it suffices to hold $f_{cpx}/f_s$ constant in the expression (1). That is to say, even if $f_s$ is changed, the necessity to alter the circuit is eliminated by correspondingly changing $f_{cpx}$ so that the right side of the expression (1) will always be constant. The frequency divider circuit 14 serves to change $f_{cpx}$.

As described before, in the mode $M_1$ for rotating the motor 3 with the number of rotations N, the frequency of the clock pulse CPX is equal to the frequency $f_{cp}$ of the clock pulse CP. In the mode $M_2$ for rotating the motor 3 with the number of rotations N/2, the frequency of the input signal A is decreased to half. In this case, however, the frequency of the clock pulse CPX is also $f_{cp}/2$ as a result of frequency division with the ratio of ½ in the frequency divider circuit 14. In the mode $M_3$ for rotating the motor 3 with the number of rotations N/3, the frequency of the input signal A is decreased to one third. The frequency of the clock pulse CPX is then $f_{cp}/3$ due to the frequency division with the ratio of ⅓. Thus, the value of $f_{cpx}/f_s$ is held constant in these three modes. Accordingly, the circuit as far as the data latch circuit 19 is not required to be altered, but may be commonly used. As a result, the circuit configuration may be simplified.

As evident from the expression (5), however, the detection sensitivity $K_o$ is not constant even if $f_{cpx}/f_s$ is held constant. The detection sensitivity in the mode $M_2$ is twice that in the mode $M_1$. The detection sensitivity in the mode $M_3$ is three times that in the mode $M_1$. As described before, therefore, the loop gain of the servo-control system varies according to the speed mode.

In accordance with the present invention, the above described drawback is obviated by changing mode by mode the modulation degree of the pulse width modulation effected according to the output data $D_2$ from the data latch circuit 19 and by obtaining a constant detection sensitivity for every mode as a result. The operation to change the modulation degree will now be described by referring to FIGS. 4a to 4c.

Figure 4A:
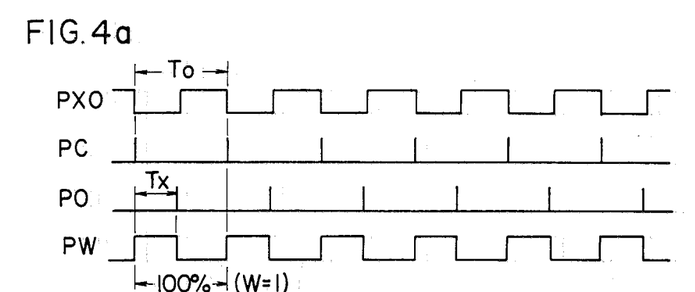
Figure 4B:
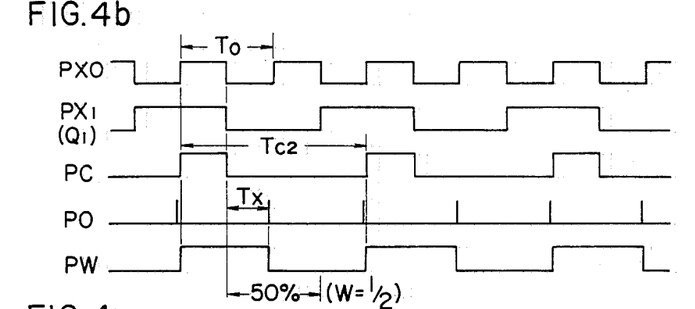
Figure 4C:
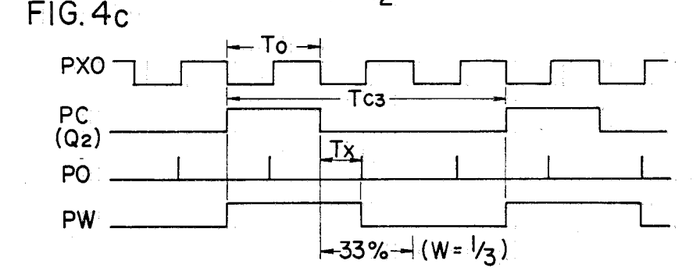

FIGS. 4a to 4c illustrate waveforms appearing at various points in FIG. 2 in respective modes. Assuming that the frequency of the clock CP is $f_{cp}$, the frequency $f_o$ and the period $T_o$ of the most significant bit output PXO of the value counted in the counter 21 (PXO illustrated in FIGS. 4a to 4c) are given by $$f_o = 1/T_o = f_{cp}/2^n \qquad (6)$$

The coincidence pulse PO is produced when the counted value in the counter 21 has coincided with the value $N_x$ of the output data $D_2$ from the data latch circuit 19. The falling edge of the output PXO corresponds to the time when the value counted in the counter 21 is Zero. Therefore, the time $T_x$ from the falling edge of the output PXO until the appearance of the coincidence pulse PO (Tx illustrated in FIGS. 4a to 4c) is given by $$T_x = N_x/f_{cp} \qquad (7)$$

From expressions (3), (6) and (7), the variation range of $T_x$ is given by $$0 \leq T_x < T_o \qquad (8)$$

In particular, it is appreciated from the expression (4) that Tx at the center frequency of the input signal A is given by $$T_x = T_o/2 \qquad (9)$$

At first, in the mode $M_1$, the carrier signal PC is generated at the falling edge of the output PXO from the counter 21 as illustrated in FIG. 4a.

As represented by PW in FIG. 4a, the pulse width modulation circuit 32 is set by the carrier signal PC fed from the pulse generating circuit 22, the output PW of the circuit 32 assuming the "high" level. The circuit 32 is reset by the coincidence pulse PO fed from the data coincidence circuit 31, the output PW of the circuit 32 assuming the "low" level. That is to say, the carrier signal PC is subjected to pulse width modulation so as to have the pulse width of $T_x$. From the expression (8), the variation allowance of the pulse width is $T_o$, which is equal to the period $T_o$ of the carrier signal PC. Accordingly, the modulation degree is 100% (W=1). In addition, it is appreciated from the expression (9) that the duty cycle of the output PW is ½ at the center frequency of the input signal A.

In the mode $M_2$ as illustrated in FIG. 4b, the carrier signal PC having a frequency of $f_o/2$ (period of $T_{c2}=2T_o$) and a duty cycle of ¼ is generated using the output PXO of the counter 21 and a signal PX1 which is derived by applying frequency division with the ratio of ½ to the signal PXO. While the carrier signal PC is at its "high" level, the pulse width modulation circuit 32 is set with priority, the output PW assuming the "high" level. (While the carrier signal PC is at its "high" level, reset operation by the coincidence pulse PO which is fed from the data coincidence circuit 31 is inhibited.) By the coincidence pulse PO applied while the carrier signal PC is at the "low" level, the pulse width modulation circuit 32 is reset to change the output PW to the "low" level. The minimum value, the maximum value and the variation allowance of the pulse width of the output PW are $T_o/2$, $3T_o/2$ and $T_o$, respectively. Since the period of the output PW is $2T_o$, its modulation degree is 50% (W=½). In addition, it is appreciated from the expression (9) that the output PW has a pulse width of $T_o$ and a duty cycle of ½ at the center frequency of the input signal A.

In the mode $M_3$ as illustrated in FIG. 4c, the signal PXO is subjected to frequency division with the ratio of ⅓. Thus, the carrier signal PC having a frequency of $f_o/3$ (period $T_{c3}=3T_o$) and a duty cycle of ⅓ is generated. In the same way as the foregoing description, while the carrier signal PC is at the "high" level, the pulse width modulation circuit 32 is set with priority to change the output PW to its "high" level. While the carrier signal PC is at its "low" level, the pulse width modulation circuit 32 is reset by the coincidence pulse PO to change the output PW to its "low" level. The minimum value, maximum value and variation range of the pulse width of the output PW are $T_o$, $2T_o$ and $T_o$, respectively. Since the period of the output PW is $3T_o$, the modulation degree is 33% (W=⅓). In addition, the pulse width is $3T_o/2$ and the duty cycle is ½. Assuming that the pulse width modulation signal PW has an amplitude value of $V_o$ and a modulation degree of W, the detection sensitivity K of the entire circuit illustrated in FIG. 2 ranging from the input terminal 100 to the output terminal 200 (the ratio of a variation in the error signal E to a variation in the frequency of the input signal A) is given by $$K = \frac{1}{2\pi \cdot f_s^2} \times \frac{f_{cpx}}{2^n} \times V_o \times W \quad (10)$$

$$= K_o \times V_o \times W.$$

As described above, the modulation degree is 100% and W=1 in the mode $M_1$. In the mode $M_2$, $K_o$ is doubled. Since the modulation degree is 50% and W=½, however, the detection sensitivity in the mode $M_2$ is the same as that in the mode $M_1$. In the mode $M_3$, $K_o$ is trebled. Since the modulation degree is 33% and W=⅓, however, the detection sensitivity in the mode $M_3$ is also the same as that in the mode $M_1$.

In all of these modes, the duty ratio of the output PW automatically becomes ½ at the center frequency of the input signal. Accordingly, an unwanted DC offset is not produced when the mode is changed. Without the necessity for a particular adjustment in each mode, it is always possible to realize stable servocontrol at the best condition.

As described above, FIGS. 4a to 4c illustrate embodiments where the modulation degree W is 1/1, ½ and ⅓ respectively. In the same way, FIG. 5a and FIG. 5b illustrate embodiments where the modulation degree W is ¼ and 1/5, respectively.

Figure 5A:
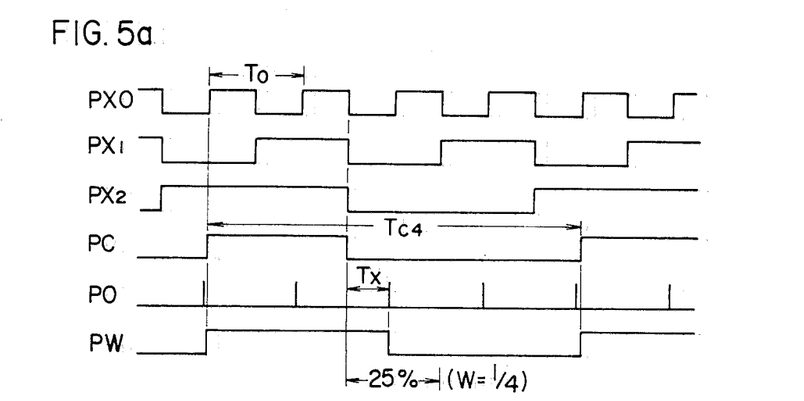

In FIG. 5a, the modulation degree W is ¼. Using the signal PXO, a signal PX1 obtained by applying frequency division with the ratio of ½ to the signal PXO, and a signal PX2 obtained by further applying frequency division with the ratio of ½ to the signal PX1, the carrier signal having a frequency of $f_o/4$ (period $T_{c4}=4T_o$) and a duty cycle of ⅜ is generated. In the same way as the foregoing description, the pulse width of the output PW from the pulse width modulation circuit 32 has a minimum value of $3T_o/2$ and a maximum value of $5T_o/2$.

Figure 5B:
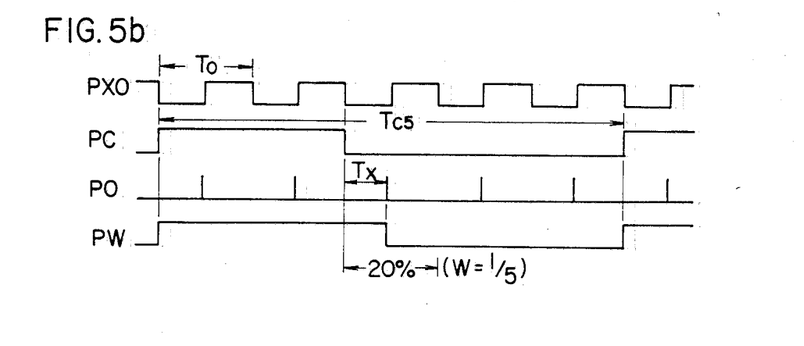

In FIG. 5b, the modulation degree W is 1/5. By applying frequency division with the ratio of 1/5 to the signal PXO, the carrier signal PC having a frequency of $f_o/5$ (period $T_{c5}=5T_o$) and a duty cycle of 2/5 is produced. The pulse width of the output PW from the pulse width modulation circuit 32 has a minimum value of $2T_o$ and a maximum value of $3T_o$.

As evident from embodiments illustrated in FIGS. 4a to 4c and FIG. 5a and FIG. 5b, the modulation ratio generally expressed as W=1/k, where k is an integer, may be obtained by generating a carrier signal having a frequency $f_o/k$ (or a period $k \cdot T_o$) and a duty cycle $(k-1)/2k$. As a result, it is possible to obtain a pulse width modulation signal PW having a minimum pulse width $T_o \cdot (k-1)/2$, a maximum pulse width $T_o \cdot (k=1)/2$, and a period $K \cdot T_o$ from the pulse width modulation circuit 32. In addition, the duty cycle is always ½ at the outer frequency of the input signal.

Figure 6:
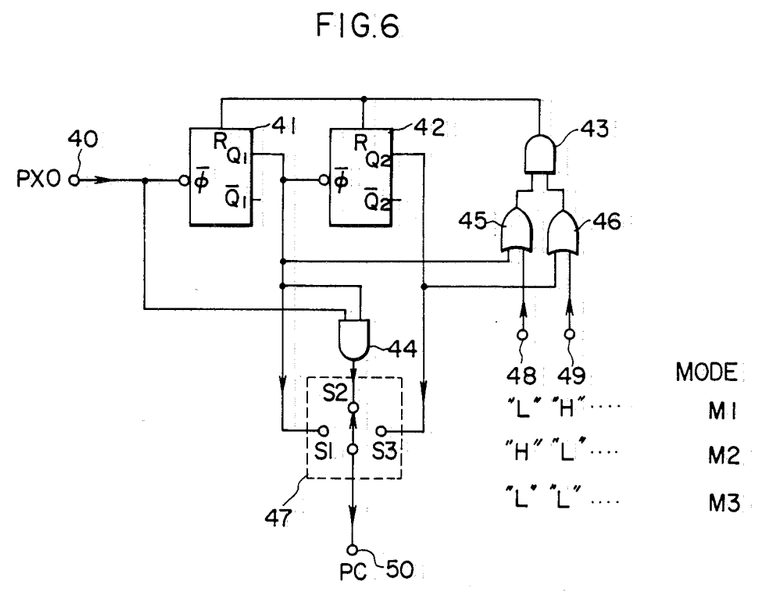
FIG. 6 is a block diagram of an embodiment of a pulse generating circuit according to the present invention.

FIG. 6 shows an embodiment of a pulse generating circuit illustrated in FIG. 2 according to the present invention. Waveforms at various points in FIG. 6 are illustrated in FIGS. 4a to 4c.

In FIG. 6, reference numeral 40 denotes an input terminal for receiving the output PXO of the counter 21. Reference numeral 50 denotes an output terminal for the carrier signal PC, 41 and 42 flip-flops, 43 and 44 AND gates, 45 and 46 OR gates, and reference numeral 47 denotes a selector.

In the mode $M_1$, terminals 48 and 49 are provided with the "low" level and the "high" level, respectively. The selector 47 is thrown to the terminal $S_1$ to feed the $Q_1$ output of the flip-flop 41 to the terminal 50 as the carrier signal PC. At the falling edge of the signal PXO fed from the terminal 40, the flip-flop 41 is triggered to change its output $Q_1$ from the "low" level to the "high" level. The $Q_1$ output is then fed to the reset input R of the flip-flop 41 through the gates 45 and 43, the flip-flop 41 being reset. Thus, the $Q_1$ output changes from the "low" level to the "high" level. As represented by PC in FIG. 4a, the carrier signal PC having a narrow pulse width is generated at the falling edge of the signal PXO.

In the mode $M_2$, the terminals 48 and 49 are provided with the "high" level and the "low" level, respectively. The selector 47 is thrown to the terminal $S_2$ to feed the output of the gate 44 to the terminal 50. The signal PXO at the terminal 40 is subjected to frequency division with the ratio of $\frac{1}{2}$ in the flip-flop 41. The output $Q_1$ of the flip-flop 41 (i.e., $PX_1$ illustrated in FIG. 4b) and the signal PXO are applied to the AND gate 44. As represented by PC in FIG. 4b, therefore, the carrier signal PC having a duty cycle of $\frac{1}{4}$ is fed from the gate 44 to the terminal 50.

In the mode $M_3$, the terminals 48 and 49 are provided with the "low" level and the "high" level, respectively. The selector 47 is thrown to the terminal $S_3$ to feed the $Q_2$ output of the flip-flop 42 to the terminal 50. The flip-flop 42 is triggered by the falling edge of the $Q_1$ output of the flip-flop 41. When both $Q_1$ and $Q_2$ outputs assume the "high" levels, the output of the gate 43 assumes the "high" level to reset the flip-flops 41 and 42. Thereby, the signal PXO at the terminal 40 is subjected to frequency division with the ratio of $\frac{1}{4}$. As represented by PC in FIG. 4c, the $Q_2$ output of the flip-flop 42 has a duty cycle of $\frac{1}{8}$.

The pulse width modulation signal PW is sent out from the pulse width modulation circuit 32 as described above only in case the sampling pulse $SP_1$ is supplied during a period ranging from the time when the counter 15 counts $N_1$ until the time when the counter 15 counts $N_2$ (i.e., during the shaded period $T_2-T_1$ in FIG. 3). In case the sampling pulse $SP_1$ is supplied during a period until the counter 15 counts $N_1$ (i.e., during the period $T_1$ illustrated in FIG. 3), in other words, in case the frequency of the input signal A becomes higher than the detection center frequency because of variation in the motor speed, that fact is recognized by using the sampling pulse $SP_1$ which is supplied from the clock latch circuit 11 to the pulse width modulation circuit 32 and using the outputs of decoders 16 and 17 which are fed to the circuit 32. Then the pulse width modulation circuit 32 yields a "low" level output. In case the sampling pulse $SP_1$ is supplied during a period after the counter 15 has counted $N_1+N_2$ (i.e., during a period succeeding the period $T_2$ illustrated in FIG. 3), in other words, in case the frequency of the input signal A is lower than the detection center frequency, the pulse width modulation circuit 32 yields a "high" level output.

Owing to the frequency discrimination as described above, the detection circuit has a monotonically decreasing frequency characteristic. Thus, a servocontrol system having a favorable transient characteristic may be realized.

As described above, FIG. 2 shows an embodiment of a detector circuit for frequency discrimination according to the present invention. However, the present invention is not restricted to this embodiment. For example, if the clock input C of the data latch circuit 19 illustrated in FIG. 2 which is a so-called sample and hold circuit for effecting phase comparison is provided with a sampling pulse generated from a signal X which is different from the input signal A, a so-called phase comparison circuit for discriminating the difference between the phase of the signal A and that of the signal X may be realized. Even in this case, it is easy to fix the detection sensitivity of the entire circuit in discriminating signals having different center frequencies. In addition, for a fixed mode or a fixed center frequency, the detection sensitivity may be changed over as evident from the expression (10). Even in this case, any DC offset and hence any phase deviation is not produced by the sensitivity change-over. Thus, this application is suitable to the case where the loop gain of the control system is changed to change only its response characteristic.

Further, the present invention may be applied not only to the servocontrol unit heretofore described, but also to a unit which detects a frequency change of a signal or a phase change of a signal with respect to the phase of a reference signal and which sends out the detected result in the analog form such as the voltage form. For instance, the present invention may also be applied to a measuring apparatus for widely detecting a variation in frequency or phase or to an apparatus for receiving the variation thus detected to give an alarm indication.

As heretofore described, the present invention provides a servocontrol unit in which the detection sensitivity for the phase or frequency of a signal to be discriminated may be easily changed without producing a DC offset, a servocontrol unit which always assures stable, uniform controllability in different control modes without the necessity for a particular adjustment, or a servocontrol unit in which the system response characteristic may be varied according to the application.

We claim:

1. A detector circuit for detecting a phase or frequency error or an input signal, comprising:
    means for selecting one mode of at least two detection mode according to a phase or frequency of said input signal, each mode having a reference value of a phase or frequency of said input signal, said reference values of the detection modes being different from each other;
    counter means for counting clock pulses by predetermined numbers;

data latching means for latching counted data of said counter means in response to a sampling pulse produced from said input signal;

pulse generating means for generating a pulse signal having a phase corresponding to said counted data latched by said latching means;

means for generating a carrier signal in response to the mode selected by said selecting means; and pulse width modulation circuit means for pulse width modulating said carrier signal with a modulation factor in response to said pulse signal, the modulation factor of each of the detection modes being different from each other.

2. A detector circuit according to claim 1, wherein said carrier signal generating means generates said carrier signal having a frequency of fo/k (fo being an arbitrary frequency and k being a positive integer) and a duty ratio of (k−1)/2k.

3. A detector circuit according to claim 1, wherein said at least two detection modes include a first detection mode and a second detection mode, the reference value of said first detection mode being 1/k (k being a positive integer) of the reference value of sid second detection mode, and said detector circuit further comprises means for dividing a frequency of said clock pulses of said first detecting mode to 1/k (k being a positive integer) of the frequency of said second detection mode.

4. A detector circuit according to claim 1, wherein said input signal includes a first input signal and a second input signal, said counter means being reset or initialized in response to said first input signal, and said sampling pulse being produced from said second input signal.

* * * * *